United States Patent Office 2,992,207
Patented July 11, 1961

2,992,207
PROCESS FOR REMOVING WATER FROM ALDEHYDE-PENTAERYTHRITOL RESINS

Howard R. Guest, Charleston, Ben W. Kiff, Ona, and Calvert B. Halstead, St. Albans, W. Va., assignors to Union Carbide Corporation, a corporation of New York
No Drawing. Filed Sept. 16, 1957, Ser. No. 683,957
9 Claims. (Cl. 260—67)

This invention relates to a method for preventing the evolution of lachrymatory gases in the curing of resins formed from alpha,beta-unsaturated aldehydes with pentaerythritol. More specifically, this invention relates to a novel method of removing water from liquid resinous compositions containing reaction products of alpha,beta-unsaturated aldehydes and pentarythritol in order to prevent hydrolysis of the reaction products during the curing stage of the resin. Hydrolysis of these materials produces lachrymatory gases such as acrolein, crotonaldehyde and their substitution products.

At present, two methods are known for carrying out the polymer forming reaction of alpha,beta-unsaturated aldehydes and pentaerythritol. According to one method, the reaction is carried out by first forming and isolating the unsaturated spirobi (m-dioxane) resulting from the reaction of an alpha,beta-unsaturated aldehyde and pentaerythritol. Such reaction products may be represented by the following general formula:

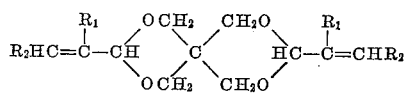

where $R_1$ is hydrogen, an alkyl radical, or a halogen, and $R_2$ is hydrogen or an alkyl radical.

These unsaturated compounds are known to enter into resinification reactions with polyhydric alcohols in the presence of acidic catalysts. Such reactions proceed by the sequential addition of the unsaturated groups of the spiro-compound to the hydroxyl groups of the polyhydric alcohols to form a polyether.

The practice of the second method of polymer formation with alpha,beta-unsaturated aldehydes and pentaerythritol involves the formation of a liquid pre-condensate by reacting the aldehyde and pentaerythritol in reciprocal proportion to their functionality. Thus, pentaerythritol has a functionality of four as a polyhydric alcohol, and acrolein has a functionality of three, considering the reactivity of both the carbonyl group and the olefinic group. The pre-condensate thus formed on reacting about three moles of pentaerythritol and about four moles of acrolein in the presence of an acid catalyst is a viscous liquid or A-stage resin which slowly condenses to a solid plastic. However, for practical applications, the condensation can be stopped by the neutralization or removal of the catalyst. Catalysts such as hydrochloric acid are easily removed by heating the composition after the formation of the A-stage resin. Furthermore, when hydrochloric acid is used, it need not be completely removed from the liquid resin, since part of it combines with the liquid resin and is thus a poor catalyst for the curing step. The neutral liquid pre-condensate can be stored until needed and can then be hardened into a plastic by the addition of certain mineral acids or a strong organic acid. Because of the multiplicity of functional groups and various combinations possible, the A-stage material cannot be described by simple equations. Along with more complex reaction products, which form the resinous portion of the liquid, appreciable quantities of monomeric compounds are formed. In the case of the reaction of pentaerythritol and acrolein the following acetals are formed:

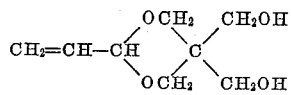

2-vinyl-1,3-dioxane-5,5-dimethanol; and

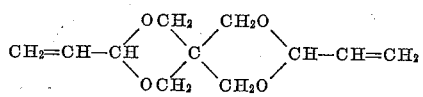

3,9-divinylspirobi (m-dioxane)

When other alpha,beta-unsaturated aldlehydes, such as alpha-chloroacrolein, alpha-methylacrolein, crotonaldehyde, alpha-chlorocrotonaldehyde and alpha-methylcrotonaldehyde are used as the starting materials in place of the acrolein the following unsaturated spirobi (m-dioxane) compounds are formed along with their mono-unsaturated 1,3-dioxanes:

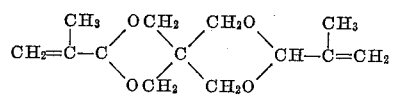

3,9-diisopropenylspirobi (m-dioxane)

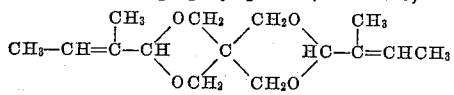

3,9-bis(1-methylpropenyl)spirobi (m-dioxane)

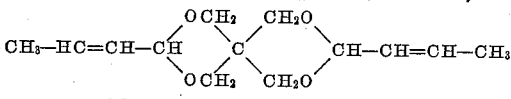

3,9-dipropenylspirobi (m-dioxane)

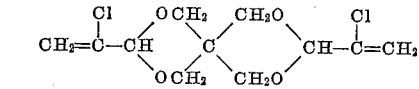

3,9-bis(1-chlorovinyl)spirobi (m-dioxane)

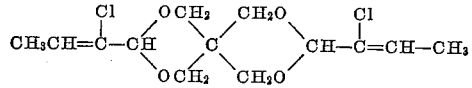

3,9-bis(1-chloropropenyl)spirobi (m-dioxane)

These compounds are given as examples and the applicants do not intend to limit themselves to these unsaturated spirobi (m-dioxane) compounds since the longer alkyl chain aldehydes and their halogen derivatives behave in a similar manner.

In certain cases it is of value to add more of the unsaturated spirobi (m-dioxane) to the A-stage resin in order to modify the properties of the final polymer.

The final polymer is produced by heating the A-stage resin in the presence of an acid or acid reacting material. At the beginning of this curing step there is always some of the unsaturated spirobi (m-dioxane) present in the A-stage mixture. Before the spirobi compound reacts to become a part of the resin molecule it is very susceptible to hydrolysis. The remaining acetals and the truly resinous portion of the A-stage material are less susceptible to hydrolysis than the spirobi compound.

In the conventional method of producing the A-stage material, after the reaction is complete, the unreacted acrolein and water of reaction are distilled off at 75–90° C./10–20 mm. However, such a stripping procedure does not result in the complete removal of water. In certain situations the presence of water is particularly objectionable during the curing operation. The unsaturated spirobi (m-dioxane) present in the A-stage material is hydrolyzed with this water when the acid curing catalyst is added and the mixture is heated. In this reaction, the alpha,beta-unsaturated aldehyde used in the original reaction is liberated. Many of these aldehydes are very toxic and powerful lachrymators and thus the presence of more than minute amounts must be avoided. When the resins are cured in bulk to make fairly large molded pieces, this problem is relatively minor. Apparently in such cases the liberated lachrymators tend to react or recombine with the resin as the curing proceeds and therefore do not become a nuisance. It is in applications where thin layers are cured and large surface areas are exposed during the initial stage of the curing cycle that the problem becomes acute. Such applications include the manufacture of laminates, grinding wheels, and flooring compositions.

Once the high molecular weight polymer is formed in the curing step, it is not susceptible to hydrolysis. In fact, one of its outstanding properties is its resistance to aqueous solutions of acid and alkali.

Applicants have now found that the A-stage resin is surprisingly stable to heat and that the resin can be heated to a high temperature at low pressures so that the unsaturated spirobi (m-dioxane) which they contain will actually reflux. This was found to be true both in resins prepared by neutralizing the acid catalyst and by those prepared by removing the acid catalyst. These materials can be heated as high as 210° C. at reduced pressures for short periods of time in the absence of a catalyst without polymerization occurring to any appreciable extent. It was further found that after such treatment the resin suffered little or no ill effects and that after acid was added and the material cured, the polymer had good properties. From these discoveries there was developed a procedure for effectively reducing the amount of water present in the A-stage resin and thereby greatly minimizing the nuisance of the evolved lachrymatory gases such as acrolein, crotonaldehyde, and chloroacrolein.

In this process the A-stage resin is charged to a still with an effective vacuum system and a fairly good column. The material is then heated to a kettle temperature of about 125 to 210° C. The pressure on the system is then reduced until the unsaturated spirobi (m-dioxane) begins to reflux. Since this is the next higher boiling component above water in the mixture, the water tends to concentrate in the head during this refluxing period. A small amount of the unsaturated spirobi (m-dioxane) may actually be collected as distillate if desired in order to facilitate the removal of the water.

The preferred temperature during this operation is from 150° C. to 200° C. and the pressure may vary from 5 mm. to 50 mm. although any pressure-temperature combination which causes the spirobi compound to reflux is operable. The preferred spirobi (m-dioxane) compounds of this invention are the reaction product of pentaerythritol and an alpha-beta unsaturated aliphatic aldehyde having 3–6 carbon atoms. The time required may be from 1 to 4 hours. When conducted properly this procedure will lower the water content to 0.01%–.03% by weight based on the resinous composition. Resins treated by the conventional means for water removal may liberate from 0.1 to 0.5% by weight of acrolein during the curing operation while material treated in this fashion will evolve only from 0.01% to 0.04% of the lachrymator by weight during the curing process. If additional quantities of the unsaturated spirobi (m-dioxane) are added to the A-stage resin in order to modify its properties it should be present when the material is given the above treatment.

Example I

An A-stage resin was prepared by the reaction of 29.8 lbs. of acrolein and 41.6 lbs. of pentaerythritol with 70 g. of 37% hydrochloric acid catalyst. The reaction was conducted at 70–75° C. for 70 minutes. At the end of that time the mixture was stripped to a kettle temperature of 75° C./4 mm. Analysis of the resin showed that it contained 0.12% water.

A sample of this material (300 g.) was charged to a reaction flask equipped with a stirrer, thermometer and a nitrogen inlet line with a gas diffuser. A gas outlet line was connected to a scrubber containing an aqueous solution of hydroxylamine hydrochloride. Dry mixed alkanesulfonic acid (0.6 g.) was added to the resin. The mixture was heated to 100° C. for 15 minutes while nitrogen was sparged through the apparatus and through the hydroxylamine solution at the rate of 56 liters per hour. At the end of that period the resin had cured to a very viscous mass.

The hydroxylamine hydrochloride solution was carefully transferred to a flask and titrated for acidity resulting from its reaction with acrolein liberated during the curing process. This was found to be 0.248% based on the total weight of the sample evaluated.

A charge of 300 g. of the same resin was placed in a distilling flask and connected to a packed column one inch in diameter and one foot long. The material was heated to 198° C./32 mm. At that point the 3,9-divinylspirobi (m-dioxane) contained in the A-stage material began to reflux. This operation was continued for one hour. Water concentrating in the top of the column was allowed to weather through the condenser to the vacuum source. At the conclusion of the reflux period, the resin was cooled and analyzed. It contained 0.014% water.

A sample of 200 g. of this treated A-stage material was mixed with 0.6% of dry mixed alkanesulfonic acids and evaluated for evolution of acrolein in the manner described above. The acrolein liberated was only 0.029% by weight of the sample.

Example II

An A-stage resin was prepared by the reaction of 44.3 lbs. acrolein and 62.4 lbs. pentaerythritol, with 180 g. of 37% hydrochloric acid catalyst in 6.1 lbs. water. The reaction was conducted at 70–75° C. for 46 minutes. At the end of that time the resin was stripped to a kettle temperature of 75° C./7 mm.

To 750 g. of the above stripped resin there was added 250 g. of refined 3,9-dinvinylspirobi (m-dioxane). 250 g. of this mixture was charged to a reaction flask equipped with stirrer, thermometer and a nitrogen diffuser. A gas outlet line was conducted to a scrubber containing an aqueous solution of hydroxylamine hydrochloride. Dry mixed alkanesulfonic acid (0.6 g.) was added to the resin and the mixture was heated to 100° C. while $N_2$ was diffused through it into the hydroxylamine solution at the rate of 56 liters per hour.

Analysis of the scrubber hydroxylamine hydrochloride for aldehyde showed the original material liberated 0.274% aldehyde calculated as acrolein. By analysis this blend was found to contain 0.272% water.

A charge of 500 g. of this same mixture was placed in a distilling flask and connected to a packed column one inch in diameter and one foot long. The mixture was heated to 180° C./10 mm. At that point the 3,9-divinylspirobi (m-dioxane) contained in the mixture began to reflux. This operation was continued for four hours. The water concentrated in the top of the column was allowed to weather through the condenser to the vacuum source. At the conclusion of the reflux period the resin was cooled and analyzed. It contained 0.023% water.

A sample of 200 g. of this treated mixture was mixed with 0.6% of dry mixed alkanesulfonic acids and evaluated for evolution of acrolein in the manner described above. The acrolein liberated was only 0.037% by weight of the sample.

Example III

An A-stage resin was prepared using the same quantities of reactants as in Example II. The reaction was conducted at 70–75° C. for thirty-three minutes. At the end of that time the resin was stripped to a kettle temperature of 75° C./7 mm.

To 750 g. of the above resin there was added 250 gms. of refined 3,9-divinylspirobi (m-dioxane). 200 g. of this mixture plus 0.6 gm. dry mixed alkanesulfonic acid was charged to a reactor as described in Example II and run under the same conditions.

Analysis of the scrubber hydroxylamine hydrochloride for aldehyde showed the original material liberated 0.173% aldehyde calculated as acrolein. By analysis this blend was found to contain 0.157% water.

A charge of 500 g. of the above mixture was placed in the apparatus described in Example II. The 3,9-divinylspirobi (m-dioxane) was refluxed at a kettle temperature of 150°–160°C./10 mm. for four and one half hours. At the conclusion of the reflux period the resin was cooled and analyzed. It contained 0.033% water.

A 200 g. sample of this treated mixture was mixed with 0.6% of dry mixed alkanesulfonic acids and evaluated for evolution of acrolein in the manner described above. The acrolein liberated was only 0.041% by weight of the sample.

*Example IV*

An A-stage resin was prepared by the reaction of 214 g. of acrolein with 300 g. pentaerythritol using 1.78 g. of 37% hydrochloric acid catalyst. The reaction was conducted at 70–75° C. for thirty minutes. At the end of that time resin was stripped to a kettle temperature of 75° C./6 mm. Analysis of the stripped resin indicated that it contained 0.186% water.

To a sample of 200 g. of this material there was added 0.6 g. of dry mixed alkanesulfonic acid. This was evaluated in the manner described in the preceding examples. Based on the weight of resin charged, there was liberated 0.171% acrolein.

A charge of 200 g. of the A-stage resin was placed in the still described in Examples II and III and treated at a kettle temperature of 176°–180° C./50 mm. for four and one quarter hours. The material was cooled and analyzed and was found to contain 0.02% water.

A catalytic amount (0.6 g.) of dry mixed alkanesulfonic acids was added to this treated material and evaluated for evolution of acrolein in the manner described previously. The acrolein liberated was only 0.012% by weight of the sample.

*Example V*

A charge of 434 g. of 96.8% methacrolein (6 moles), 404 g. pentaerythritol (3 moles) and 11.36 g. of 37% hydrochloric acid was placed in a 1 liter reaction flask equipped with stirrer, thermometer and condenser. The mixture was reacted at 73–75° C. for 6 hours. Volatile matter was then distilled off to a kettle temperature of 75° C./5 mm. The resulting A-stage material was a moderately viscous liquid.

A 200 g. portion of this liquid was charged to a reaction flask with 0.61 g. dry mixed alkanesulfonic acid. This was heated to 100° C. for 15 minutes while a stream of nitrogen was passed through the flask at the rate of 56 liters per hour. The effluent gas was passed through a scrubber containing a measured amount of hydroxylamine hydrochloride solution. At the conclusion of the reaction period the A-stage liquid had begun to polymerize. Titration of the acid liberated in the hydroxylamine hydrochloride solution indicated that 1.3% methacrolein based on the weight of the A-stage liquid had been given off.

A 260 g. portion of the A-stage material was then heated at a temperature of 144° to 173° C. for 6 hours. At the start of the reaction period the pressure was held at 30 mm. but was progressively lowered until it was finally 3 mm. A condenser operated at 80° C. was used. This allowed any 3,9-diisopropenylspirobi (meta-dioxane) which distilled out to be condensed and returned to the kettle but water vapor passed through the condenser to the vacuum source. At the conclusion of the reaction the resin had darkened very little and had not increased in viscosity.

A 200 g. portion of this treated A-stage material was mixed with 0.634 g. of dry mixed alkanesulfonic acid and tested for evolution of fumes in the manner used for the untreated material. Only 0.025% methacrolein was given off.

*Example VI*

A charge of 330 g. of 98% chloroacrolein (3.58 moles), 242 g. of pentaerythritol (1.79 moles), and 7.23 g. of 37% hydrochloric acid was placed in a reaction flask and reacted at 70–101° C. for 3½ hours. Volatile material was then distilled off to a kettle temperature of 75° C./5 mm. leaving a viscous A-stage liquid.

A 200 g. portion of this liquid was mixed with 0.605 g. dry mixed alkanesulfonic acid and tested for liberation of aldehyde as in the preceding example. Chloroacrolein amounting to 0.63% of the resin charged was liberated. There was charged to the apparatus described previously for fume-treating 220 g. of the A-stage material. It was heated at 124–172° C. for five hours at 10–14 mm. The condenser was operated at 80° C. as before, to allow any water to pass through the vacuum source. A 200 g. portion of the treated material was mixed with 0.67 g. of dry mixed alkanesulfonic acid and tested for liberation of aldehyde. The amount of chloroacrolein given off was only 0.036% of the weight of the resin charged.

*Example VII*

An intermediate stage of a polyester resin was prepared heating 53 g. of redistilled diethylene glycol with 44 g. of maleic anhydride for three hours at 210–220° C. The resulting product was a light yellow viscous liquid.

This material was heated for five hours at 175° C. in the manner used to treat the A-stage material as described in the specification. At the conclusion there was a marked increase in viscosity with the resin being nearly semi-solid.

What is claimed is:

1. An improved method for removing water from a liquid resinous composition produced by the reaction of pentaerythritol and an alpha,beta-unsaturated aldehyde in contact with a catalytic amount of an acid catalyst, said liquid resinous composition having incorporated therein a monomeric unsaturated spirobi (m-dioxane), which method comprises removing the acid catalyst from said liquid resinous composition, subsequently heating the remaining liquid resinous composition at an elevated temperature of from about 125° C. to about 210° C. and under a reduced pressure at which said monomeric unsaturated spirobi (m-dioxane) will reflux, and, at said elevated temperature and reduced pressure, refluxing said monomeric unsaturated spirobi (m-dioxane) while removing the water evolved from the liquid resinous composition as a distillate, thereby recovering as the distilland a liquid resinous composition having a water content of less than 0.05 percent by weight.

2. The method according to claim 1 wherein the alpha, beta-unsaturated aldehyde is acrolein.

3. The method according to claim 1 wherein the alpha, beta-unsaturated aldehyde is alpha-methylacrolein.

4. The method according to claim 1 wherein the alpha, beta-unsaturated aldehyde is alpha-chloroacrolein.

5. The method according to claim 1 wherein the alpha, beta-unsaturated aldehyde is crotonaldehyde.

6. The method according to claim 1 wherein the acid catalyst is hydrochloric acid.

7. An improved method for removing water from a liquid resinous composition produced by the reaction of pentaerythritol and an alpha,beta-unsaturated aldehyde containing from 3 to 6 carbon atoms in contact with a catalytic amount of hydrochloric acid, said liquid resinous composition having incorporated therein a monomeric unsaturated spirobi (m-dioxane), which method comprises removing hydrogen chloride and water from said liquid resinous composition as a distillate at an elevated temperature of from 75° C. to 90° C. and under a reduced pressure of from 10 to 20 millimeters of mercury, subsequently heating the remaining liquid resinous composition at an elevated temperature of from 125° C. to 210° C. and under a reduced pressure of from 5 to 50 millimeters of mercury at which said monomeric unsaturated spirobi (m-dioxane) will reflux, and, at said elevated temperature and reduced pressure, refluxing said monomeric unsaturated spirobi (m-dioxane) while removing the water evolved from the liquid resinous composition as a distillate, thereby recovering as the distilland a liquid resinous composition having a water content of less than 0.05 percent by weight.

8. The method according to claim 4 wherein the alpha, beta-unsaturated aldehyde is acrolein.

9. In the process for producing liquid resinous compositions suitable for curing to solid resins in thin layers, wherein pentaerythritol and acrolein are reacted in contact with a catalytic amount of an acid catalyst to form a liquid resinous composition having incorporated therein a monomeric 3,9-divinylspirobi (m-dioxane), and the acid catalyst then removed to form a liquid product which is stable to storage, the improvement for removing water from said liquid resinous composition which comprises heating the acid catalyst-free liquid resinous composition at an elevated temperature of from 125° C. to 210° C. and under a reduced pressure of from 5 to 50 millimeters of mercury at which said monomeric 3,9-divinylspirobi (m-dioxane) will reflux, and, at said elevated temperature and reduced pressure, refluxing said monomeric 3,9-divinylspirobi (m-dioxane) while removing the water evolved from the liquid resinous composition as a distillate, thereby recovering as the distilland a liquid resinous composition having a water content of less than 0.05 percent by weight.

References Cited in the file of this patent

UNITED STATES PATENTS

| | | |
|---|---|---|
| 2,401,776 | Rothrock | June 11, 1946 |
| 2,870,121 | Kraft | Jan. 20, 1959 |
| 2,909,506 | Guest et al. | Oct. 20, 1959 |
| 2,913,434 | Guest et al. | Nov. 17, 1959 |

FOREIGN PATENTS

| | | |
|---|---|---|
| 717,418 | Great Britain | Oct. 27, 1954 |
| 870,032 | Germany | Mar. 9, 1953 |

OTHER REFERENCES

Schulz et al.: Angewandte Chemie, vol. 62, No. 5, March 1950, pp. 105, 113–118.

UNITED STATES PATENT OFFICE
CERTIFICATION OF CORRECTION

Patent No. 2,992,207                            July 11, 1961

Howard R. Guest et al.

It is hereby certified that error appears in the above numbered patent requiring correction and that the said Letters Patent should read as corrected below.

Column 2, lines 21 to 24, the formula should appear as shown below instead of as in the patent:

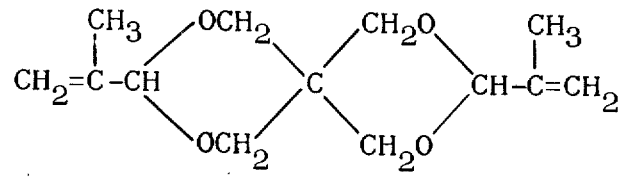

column 7, line 17, for the claim reference numeral "4" read -- 7 --.

Signed and sealed this 17th day of April 1962.

(SEAL)
Attest:

ESTON G. JOHNSON                          DAVID L. LADD
Attesting Officer                        Commissioner of Patents